(12) United States Patent
Bening et al.

(10) Patent No.: US 7,592,390 B2
(45) Date of Patent: Sep. 22, 2009

(54) HYDROGENATED BLOCK COPOLYMER COMPOSITIONS

(75) Inventors: Robert C. Bening, Katy, TX (US);
Hendrik de Groot, Hamme-Mille (BE);
Dale L. Handlin, Jr., Shelby, NC (US);
Xavier Muyldermans, Shanghai (CN);
Carl L. Willis, Houston, TX (US);
Kathryn J. Wright, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 192 days.

(21) Appl. No.: 11/388,629

(22) Filed: Mar. 24, 2006

(65) Prior Publication Data

US 2007/0225428 A1    Sep. 27, 2007

(51) Int. Cl.
*C08L 53/02* (2006.01)
*C08C 19/02* (2006.01)

(52) U.S. Cl. .......................... 524/505; 525/88; 525/89; 525/98; 525/99; 525/192; 525/197; 525/313; 525/338

(58) Field of Classification Search ................ 524/505; 525/88, 89, 98, 99, 192, 197, 313, 338
See application file for complete search history.

(56) References Cited

U.S. PATENT DOCUMENTS

| | | |
|---|---|---|
| 3,149,182 A | 9/1964 | Porter |
| 3,369,160 A | 2/1968 | Koppel |
| RE27,145 E | 6/1971 | Jones |
| 3,595,942 A | 7/1971 | Wald, et al. |
| 3,634,549 A | 1/1972 | Shaw et al. |
| 3,670,054 A | 6/1972 | De La Mare et al. |
| 3,700,633 A | 10/1972 | Wald, et al. |
| 3,766,295 A * | 10/1973 | Crossland et al. .............. 525/93 |
| 3,985,830 A | 10/1976 | Fetters et al. |
| 4,039,593 A | 8/1977 | Kamienski et al. |
| 4,122,134 A | 10/1978 | Miki et al. |
| 4,167,545 A | 9/1979 | Fahrbach et al. |
| 4,248,981 A | 2/1981 | Milkovich et al. |
| 4,391,949 A | 7/1983 | St. Clair |
| 4,444,953 A | 4/1984 | St. Clair |
| 4,578,429 A | 3/1986 | Gergen et al. |
| 4,788,361 A | 11/1988 | Olson et al. |
| 4,882,384 A | 11/1989 | Willis et al. |
| 4,898,914 A | 2/1990 | Gergen et al. |
| 4,925,899 A | 5/1990 | Rendina et al. |
| 4,970,265 A | 11/1990 | Willis |
| 5,206,300 A | 4/1993 | Chamberlain |
| 5,274,036 A | 12/1993 | Korpman et al. |
| 5,276,101 A | 1/1994 | Chamberlain et al. |
| 5,436,298 A | 7/1995 | Moczygemba et al. |
| 5,506,299 A | 4/1996 | Gelles et al. |
| 5,516,831 A | 5/1996 | Pottick et al. |
| 5,545,690 A | 8/1996 | Trepka et al. |
| 5,587,237 A | 12/1996 | Korpman et al. |
| 5,693,718 A | 12/1997 | De Groot et al. |
| 5,705,569 A | 1/1998 | Moczygemba et al. |
| 5,760,135 A | 6/1998 | Korpman et al. |
| 5,910,546 A | 6/1999 | Trepka et al. |
| 6,031,053 A | 2/2000 | Knoll et al. |
| 6,096,828 A | 8/2000 | DePorter et al. |
| 6,197,889 B1 | 3/2001 | Knoll et al. |
| 6,265,485 B1 | 7/2001 | Trepka et al. |
| 6,420,486 B1 | 7/2002 | DePorter et al. |
| 6,492,469 B2 | 12/2002 | Willis et al. |
| 6,521,712 B1 | 2/2003 | Knoll et al. |
| 6,593,430 B1 | 7/2003 | Knoll et al. |
| 6,759,454 B2 | 7/2004 | Stephens et al. |
| 6,987,142 B2 | 1/2006 | St. Clair et al. |
| 7,001,956 B2 | 2/2006 | Handlin, Jr. et al. |
| 7,012,118 B2 | 3/2006 | Hansen et al. |
| 7,067,589 B2 | 6/2006 | Bening et al. |
| 7,070,363 B2 | 7/2006 | Long, II et al. |
| 7,084,347 B2 | 8/2006 | Mhetar et al. |
| 7,138,456 B2 | 11/2006 | Bening et al. |
| 7,141,621 B2 | 11/2006 | St. Clair et al. |
| 7,169,848 B2 | 1/2007 | Bening et al. |
| 7,169,850 B2 | 1/2007 | Handlin, Jr. et al. |
| 7,217,885 B2 | 5/2007 | Mhetar et al. |
| 7,217,886 B2 | 5/2007 | Mhetar et al. |
| 7,220,917 B2 | 5/2007 | Mhetar et al. |
| 7,223,816 B2 | 5/2007 | Handlin, Jr. et al. |
| 7,226,484 B2 | 6/2007 | Chen |
| 7,244,785 B2 | 7/2007 | Bening et al. |
| 7,267,855 B2 | 9/2007 | Handlin, Jr. et al. |
| 7,282,536 B2 | 10/2007 | Handlin, Jr. et al. |
| 7,290,367 B2 | 11/2007 | Chen |
| 7,332,677 B2 | 2/2008 | Xu et al. |

(Continued)

FOREIGN PATENT DOCUMENTS

| | | |
|---|---|---|
| CA | 716 645 | 8/1965 |
| WO | 2004/108784 A1 | 12/2004 |
| WO | 2005/097900 A1 | 10/2005 |
| WO | 2006/065497 A1 | 2/2006 |
| WO | 2006/065502 A1 | 6/2006 |
| WO | 2006/065519 A1 | 6/2006 |
| WO | 2006/088707 A1 | 8/2006 |
| WO | 2007/111853 A1 | 10/2007 |

OTHER PUBLICATIONS

USPTO Office Action Mailed Apr. 3, 2008, from U.S. Appl. No. 11/388,628.

*Primary Examiner*—Roberto Rábago
(74) *Attorney, Agent, or Firm*—Dean F. Vance; Novak, Druce & Quigg LLP

(57) ABSTRACT

The present invention relates to novel compositions comprising (a) anionic block copolymers of mono alkenyl arenes and conjugated dienes, and (b) tailored softening modifiers have a particular polydispersity index that results in a surprising improvement in properties for the composition. Also included are processes for the manufacturing such novel compositions and various end-uses and applications for such compositions.

27 Claims, No Drawings

U.S. PATENT DOCUMENTS

| | | |
|---|---|---|
| 2003/0166776 A1 | 9/2003 | Wright et al. |
| 2003/0181584 A1 | 9/2003 | Handlin, Jr. et al. |
| 2004/0138371 A1 | 7/2004 | St. Clair et al. |
| 2005/0171290 A1 | 8/2005 | Bening et al. |
| 2005/0285086 A1 | 12/2005 | Kosaka et al. |
| 2005/0288406 A1 | 12/2005 | Gallucci et al. |
| 2006/0106139 A1 | 5/2006 | Kosaka et al. |
| 2006/0182967 A1 | 8/2006 | Kosaka et al. |
| 2006/0205849 A1 | 9/2006 | St. Clair |
| 2006/0205904 A1 | 9/2006 | St. Clair |
| 2007/0225427 A1 | 9/2007 | Wright et al. |
| 2007/0225429 A1 | 9/2007 | Wright et al. |
| 2008/0015306 A1 | 1/2008 | Wright et al. |

* cited by examiner

HYDROGENATED BLOCK COPOLYMER COMPOSITIONS

FIELD OF THE INVENTION

This invention relates to novel compositions comprising (a) anionic hydrogenated block copolymers of mono alkenyl arenes and conjugated dienes, and (b) tailored softening modifiers having a particular polydispersity index that results in a surprising improvement in properties for the composition.

BACKGROUND OF THE INVENTION

The preparation of block copolymers is well known. In a representative synthetic method, an initiator compound is used to start the polymerization of one monomer. The reaction is allowed to proceed until all of the monomer is consumed, resulting in a living homopolymer. To this living homopolymer is added a second monomer that is chemically different from the first. The living end of the first polymer serves as the site for continued polymerization, thereby incorporating the second monomer as a distinct block into the linear polymer. The block copolymer so grown is living until terminated.

Termination converts the living end of the block copolymer into a non-propagating species, thereby rendering the polymer non-reactive toward monomer or coupling agent. A polymer so terminated is commonly referred to as a diblock copolymer. If the polymer is not terminated the living block copolymers can be reacted with additional monomer to form a sequential linear tri-block copolymer. Alternatively the living block copolymer can be contacted with multifunctional agents commonly referred to as coupling agents. Coupling two of the living ends together results in a linear triblock copolymer having twice the molecular weight of the starting, living, diblock copolymer. Coupling more than two of the living diblock copolymer regions results in a radial block copolymer architecture having at least three arms.

One of the first patents on linear ABA block copolymers made with styrene and butadiene is U.S. Pat. No. 3,149,182. These polymers in turn could be hydrogenated to form more stable block copolymers, such as those described in U.S. Pat. Nos. 3,595,942 and Re. 27,145. Various other block copolymers and processes for making them have been proposed over the years.

While block copolymers are often used in compounded form, the presence of certain of the typical blending components can also have a detrimental impact on properties. Common blending components include plasticizing oils, tackifying resins, polymers, oligomers, fillers, reinforcements and additives of all varieties. Oils are often added to such block copolymers to increase softness and improve processability to the compound. However, such oils also typically reduce the temperature resistance, strength and tear resistance of the compounds. What is needed now are new compounding materials that do not have such a dramatic negative effect on properties, while still imparting increased softness with improved processability.

Others have proposed compounds or articles having improved properties by blending in various other polymers. For example, Crossland et al, U.S. Pat. No. 3,766,295, suggests that compositions comprising 100 parts by weight of a block copolymer having at least two polymer blocks A of a monoalkenyl arene and at least one block of a hydrogenated diene when combined with 5-200 parts by weight of a low mol weight hydrogenated diene having a particular vinyl content have improved properties. However, as shown in the examples of Crossland, the only polymer that showed improvement in properties was a hydrogenated polybutadiene having a molecular weight of 9,100. Moreover, it is expected that blending such high mol weight, low polydispersity index homopolymers at high concentrations (greater than 100 phr) will result in oil bleed out at elevated temperatures. Korpman et al, U.S. Pat. No. 5,274,036 and related patents, discloses pressure sensitive adhesives comprising a solid rubber and a liquid rubber in a ratio of solid rubber to liquid rubber of 1:0.5 to 1:7. The liquid rubbers include hydrogenated polyisoprene and liquid hydrogenated polyisoprene where the liquid rubbers had a molecular weight from 10,000 to 75,000, although no properties were reported for materials of less than 25,000 molecular weight. Tg's of these liquid rubbers were typically <-55° C. However, it is difficult to handle the liquid rubbers separately from the solid rubber, and compositions were described only in adhesive formulations tested at body temperature or below.

Applicants have now discovered that, when certain low molecular weight anionic diene oligomers or polymers are combined in a particular way with the selectively hydrogenated block copolymers noted above, it is possible to obtain compounds which retain strength and upper service temperature properties, and also experience significant improvements in manufacturing steps and economies as well as improved properties such as increased softness without a significant reduction in processability. In addition, such compositions show little fogging and no smoke in film and fiber applications

SUMMARY OF THE INVENTION

The particular compositions of the present invention are "in-situ compositions", since the low molecular weight tailored softening modifier (which improves flow and softness) is made and/or finished "in-situ", along with the selectively hydrogenated block copolymer. This "in-situ" recovery is essential since recovery of the tailored modifier as a neat material from the solvent in which it is manufactured is very difficult and problematic. At room temperature, softening modifiers have physical properties that are intermediate between free flowing solids and pourable liquids. They are difficult to handle as neat materials. For this reason, it is desirable to recover (finish) them from the manufacturing solvent as a blend with the base block copolymer that they have been designed to modify. The blend can thus be recovered as an easy to handle solid.

The tailored softening modifier/base polymer blend may be prepared before recovery from the manufacturing solvent by 1) combining separate process streams containing the individual components—modifier and base block copolymer or 2) preparing them in the same process stream. The two approaches have different advantages. When the two components are polymerized separately and the solvent blend is prepared by mixing prior to finishing, there are few constraints on the chemistry that may be used to make the softening modifier or the base polymer. The manufacturing chemistry and associated technologies can be rather simple and robust. The softening modifier might be prepared by a conventional anionic polymerization technique—1) initiation using a metal alkyl such as a lithium alkyl, preferably with multiple additions of the lithium alkyl to obtain the appropriate Polydispersity Index, 2) propagation by addition of the appropriate monomer(s) at the appropriate amounts and timing, and 3) termination of the living chain end by addition of a stoichiometric amount of a protic reagent such as an alcohol. Alternatively, a polymerization chain transfer agent, such as a secondary amine, might be used to allow the preparation of more than one tailored softening modifier molecule per molecule of polymerization initiator. In this embodiment, the base block copolymer is prepared in a separate process step and can be made using any of the known processes for the synthesis of a block copolymer. Another approach may be to take the selectively hydrogenated block copolymer and redissolve it in an appropriate solvent, and then combine it with a solution of the tailored softening modifier, and finish the two together.

Accordingly, the present invention broadly comprises a novel block copolymer composition comprising:

(a) 100 parts by weight of a solid selectively hydrogenated block copolymer having the general configuration A-B, A-B-A, A-B-A-B, (A-B)$_n$, (A-B-A)$_n$, (A-B-A)$_n$X, (A-B)$_n$X or mixtures thereof, where n is an integer from 2 to about 30, and X is coupling agent residue and wherein:
  i. prior to hydrogenation each A block is a mono alkenyl arene polymer block and each B block is a conjugated diene block having a vinyl content ($V_1$) between 25 weight percent and 85 weight percent;
  ii. subsequent to hydrogenation about 0-10% of the arene double bonds have been reduced, and at least about 90% of the conjugated diene double bonds have been reduced;
  iii. each A block having a number average molecular weight between about 3,000 and about 60,000 and each B block having a number average molecular weight ($MW_1$) between about 30,000 and about 300,000; and
  iv. the total amount of mono alkenyl arene in the hydrogenated block copolymer is about 20 percent weight to about 80 percent weight; and (b) 5 to 250 parts by weight of a hydrogenated tailored softening modifier which is structurally related to the character of the B block of said selectively hydrogenated block copolymer wherein:
  i. said softening modifier contains at least one hydrogenated conjugated diene wherein prior to hydrogenation said modifier has a vinyl content $V_2$, such that the ratio of $V_2/V_1$ is between 0.8 and 1.2;
  ii. subsequent to hydrogenation at least about 90% of the conjugated diene double bonds have been reduced;
  iii. the ratio ($MW_2$)/($MW_1$) of the number average molecular weight of said softening modifier ($MW_2$) to the number average molecular weight of said B block ($MW_1$) is 0.01 to 0.3, with a minimum molecular weight ($MW_2$) of 2,000 and a maximum molecular weight ($MW_2$) of 20,000; and
  iv. when the polydispersity index (PDI) of said softening modifier is between 1.5 and 4.0, the number average molecular weight is between 2,000 and 20,000, and when the PDI is between 1.0 and less than 1.5, the number average molecular weight is between 2,000 and 7,000, where the polydispersity index is the ratio of the weight average molecular weight divided by the number average molecular weight; and (c) wherein said selectively hydrogenated block copolymer is formed in solution in the presence of a solvent in a first reactor to form a first solution and said tailored softening modifier is formed in solution in the presence of a solvent in a second reactor to form a second solution;

(d) said first and second solutions are combined to form a common solution; and (e) the solvent is removed from the common solution, providing an intimate mixture of said selectively hydrogenated block copolymer and said tailored softening modifier.

As noted in the Examples, one needs to use a Tailored Softening Modifier ("TSM") having a number average molecular weight of the between 2,000 and 7,000 when the polydispersity index ("PDI") is from 1.0 to less than 1.5. As shown in the Examples which follow, results with a TSM having a PDI of about 1 and a molecular weight of 1,400 were not acceptable, while results with a TSM having a PDI of about 1 and a molecular weight of 6,000 were good. However, when the same TSM molecular weight is increased to 11,000, the results are not acceptable. But if one uses a TSM having a PDI between 1.5 and 4.0, it is possible to use a broader molecular weight TSM of from 2,000 to 20,000 and obtain good results.

These particular compositions are termed "in-situ compositions", since the low molecular weight tailored modifier (which acts to improve flow and softness) is made or finished "in-situ", along with the selectively hydrogenated block copolymer. When the tailored softening modifier is made originally in a separate reactor and in a separate solution, there are a number of means to combine the solutions and obtain the particular in-situ composition. These include:

1. combining the first solution and second solutions after polymerization of both components prior to hydrogenation, hydrogenating the combined selectively hydrogenated block copolymer and tailored softening modifier in the common solution, and recovering the combined product in a finishing step;
2. combining the first solution and second solution after polymerization of both components and after hydrogenation, and then finishing the solvent blend;
3. adding the second solution to the first solution prior to polymerization of the selectively hydrogenated block copolymer, and then continuing with polymerization, hydrogenation and finishing;
4. adding the second solution to the first solution during the polymerization of the selectively hydrogenated block copolymer, followed by hydrogenation and finishing; or
5. redissolving a solid selectively hydrogenated block copolymer in a solvent to form a first solution, polymerizing and hydrogenating the tailored softening modifier in a second solution, combining the first and second solutions, and then finishing the solvent blend.

Alternatively, it is possible to make the particular composition in a single reactor. In this case, the composition comprises:

(a) 100 parts by weight of a solid selectively hydrogenated block copolymer having the general configuration A-B, A-B-A, A-B-A-B, (A-B)$_n$, (A-B-A)$_n$, (A-B-A)$_n$X, (A-B)$_n$X or mixtures thereof, where n is an integer from 2 to about 30, and X is coupling agent residue and wherein:
  i. prior to hydrogenation each A block is a mono alkenyl arene polymer block and each B block is a conjugated diene block having a vinyl content ($V_1$) between 25 weight percent and 85 weight percent;
  ii. subsequent to hydrogenation about 0-10% of the arene double bonds have been reduced, and at least about 90% of the conjugated diene double bonds have been reduced;
  iii. each A block having a number average molecular weight between about 3,000 and about 60,000 and each B block having a number average molecular weight ($MW_1$) between about 30,000 and about 300,000; and iv. the total amount of mono alkenyl arene in the hydrogenated block copolymer is about 20 percent weight to about 80 percent weight; and
(b) 5 to 250 parts by weight of a hydrogenated tailored softening modifier which is structurally related to the character of the B block of said selectively hydrogenated block copolymer wherein:
  i. said softening modifier contains at least one hydrogenated conjugated diene wherein prior to hydrogenation said modifier has a vinyl content $V_2$, such that the ratio of $V_2/V_1$ is between 0.8 and 1.2;
  ii. subsequent to at least about 90% of the conjugated diene double bonds have been reduced;
  iii. the ratio $(MW_2)/(MW_1)$ of the number average molecular weight of said softening modifier $(MW_2)$ to the number average molecular weight of said B block $(MW_1)$ is 0.01 to 0.3, with a minimum molecular weight $(MW_2)$ of 2,000 and a maximum molecular weight $(MW_2)$ of 20,000; and
  iv. when the polydispersity index (PDI) of said softening modifier is between 1.5 and 4.0, the number average molecular weight is between 2,000 and 20,000, and when the PDI is between 1.0 and less than 1.5, the number average molecular weight is between 2,000 and 7,000, where the polydispersity index is the ratio of the weight average molecular weight divided by the number average molecular weight; and
(c) wherein said selectively hydrogenated block copolymer is formed in solution in a reactor in the presence of a solvent to form a solution and said tailored softening modifier is formed in the same solution in the same reactor; and
(d) the solvent is removed from the solution, providing an intimate mixture of said selectively hydrogenated block copolymer and said tailored softening modifier.

In this case, where a single reactor is employed, the alternatives include varying the order of polymerization, wherein:
1. the softening agent is polymerized prior to the selectively hydrogenated block copolymer;
2. the softening agent is polymerized during the polymerization of the selectively hydrogenated block copolymer; and
3. the softening agent is polymerized after the selectively hydrogenated block copolymer.

In still a third variant, it is possible to have a composition in which the selectively hydrogenated block copolymer is hydrogenated, and the tailored softening modifier is not hydrogenated. In that case, the solution of the hydrogenated selectively hydrogenated block copolymer is combined with the solution of the un-hydrogenated tailored softening modifier, and then the resulting blend is recovered.

As shown in the examples that follow, compositions of the present invention will have improved upper service temperature performance and in some cases improved strength. In addition, it will be possible to obtain compositions having lower volatility at equivalent hardness, along with improved organoleptics, improved fogging characteristics and lowered extractable levels. Of primary interest, it will be possible to obtain significant and unexpected process advantages by practice of the present invention. In addition, the examples show the significant improvements obtained when the selectively hydrogenated block copolymer has blocks consisting of a copolymer of styrene and alpha-methyl styrene. Details regarding the particular selectively hydrogenated block copolymers and tailored softening modifiers, along with the processes for making them are described further below.

DETAILED DESCRIPTION OF THE INVENTION

The present invention offers novel compositions and methods of preparing such compositions. The two basic components in the novel compositions are (a) a selectively hydrogenated block copolymer, and (b) a novel tailored softening modifier.

1. Selectively Hydrogenated Block Copolymers

The selectively hydrogenated block copolymer is described and claimed in U.S. Pat. No. Re. 27,145. Regarding the particular parameters of the selectively hydrogenated block copolymer used in the present invention, the selectively hydrogenated block copolymer has the general configuration A-B, A-B-A, A-B-A-B, $(A-B)_n$, $(A-B-A)_n$, $(A-B-A)_nX$, $(A-B)_nX$ or mixtures thereof, where n is an integer from 2 to about 30, and X is coupling agent residue and wherein:
  i. prior to hydrogenation each A block is a mono alkenyl arene polymer block -and each B block is a conjugated diene block having a vinyl content $(V_1)$ between 25 weight percent and 85 weight percent;
  ii. subsequent to hydrogenation about 0-10% of the arene double bonds have been reduced, and at least about 90% of the conjugated diene double bonds have been reduced;
  iii. each A block having a number average molecular weight between about 3,000 and about 60,000 and each B block having a number average molecular weight $(MW_1)$ between about 30,000 and about 300,000; and
  iv. the total amount of mono alkenyl arene in the hydrogenated block copolymer is about 20 percent weight to about 80 percent weight.

The following are preferred ranges for the various properties of the selectively hydrogenated block copolymer:
The mono alkenyl arene is preferably styrene, alpha-methyl styrene and mixtures thereof, more preferably styrene;
The conjugated diene is preferably 1,3-butadiene, isoprene or mixtures thereof, more preferably 1,3-butadiene;
The structure is either a linear A-B-A block copolymer, an A-B-A-B tetrablock copolymer or a radial $(A-B)_nX$ block copolymer where n is 2 to 6. For certain applications, a linear block copolymer is preferred, while for other applications, a radial or branched block copolymer is preferred. It is also possible to have a combination of a linear block copolymer and a radial block copolymer;
Subsequent to hydrogenation about 0-5% of the arene double bonds have been reduced, and at least about 95% of the conjugated diene double bonds have been reduced;
Each A block preferably has a peak number average molecular weight between about 3,000 and about 60,000, more preferably between about 5,000 and 45,000, and each B block preferably has a peak number average molecular weight $(MW_1)$ between about 30,000 and about 300,000 if it is a linear block copolymer and half that amount if it is a radial block copolymer;
The total amount of mono alkenyl arene in the hydrogenated block copolymer is preferably about 20 percent weight to about 80 percent weight, more preferably about 30 to about 70 percent weight.

2. Hydrogenated Tailored Softening Modifier

The hydrogenated tailored softening modifier used with the selectively hydrogenated block copolymer is structurally related to the character of the B block of the selectively hydrogenated block copolymer wherein:
  i. said softening modifier contains at least one hydrogenated conjugated diene wherein prior to hydrogenation said modifier has a vinyl content $V_2$, such that the ratio of $V_2/V_1$ is between 0.8 and 1.2;

ii. subsequent to hydrogenation at least about 90% of the conjugated diene double bonds have been reduced;

iii. the ratio $(MW_2)/(MW_1)$ of the number average molecular weight of said softening modifier ($MW_2$) to the number average molecular weight of said B block ($MW_1$) is 0.01 to 0.3, with a minimum molecular weight ($MW_2$) of 2,000 and a maximum molecular weight ($MW_2$) of 20,000; and iv. when the polydispersity index (PDI) of said softening modifier is between 1.0 and less than 1.5, the number average molecular weight is between 2,000 to 7,000 and when the PDI is between 1.5 and less than about 4.0, the number average molecular weight is between 2,000 to 20,000, where the polydispersity index is the ratio of the weight average molecular weight divided by the number average molecular weight.

The following are preferred ranges for the properties of the Tailored Softening Modifier:

Subsequent to hydrogenation at least about 95% of the conjugated diene double bonds have been reduced the ratio $(MW_2)/(MW_1)$ of the peak molecular weight of said softening modifier ($MW_2$) to the peak molecular weight of said B block of said selectively hydrogenated block copolymer ($MW_1$) is 0.01 to 0.3, preferably 0.05 to 0.2, with a minimum molecular weight ($MW_2$) of 2,000 g/mol and a maximum molecular weight of 20,000, preferably a molecular weight of 2,000 to 8,000; and when the block copolymer is a hydrogenated styrene/butadiene block copolymer the TSM is a hydrogenated butadiene polymer and when the block copolymer is a hydrogenated styrene/isoprene block copolymer the TSM is a hydrogenated isoprene polymer.

3. Overall Process to Make Selectively hydrogenated Block Copolymer and Tailored Softening Modifier Anionic, solution co-polymerization to form the selectively hydrogenated copolymers and tailored softening modifiers of the present invention can be carried out using, to a great extent, known and previously employed methods and materials. In general, the co-polymerization is attained anionically, using known selections of adjunct materials, including polymerization initiators, solvents, promoters, and structure modifiers. In some cases, particularly where the vinyl content of the conjugated diene is to be over 50%, it may be necessary to use a chelating agent, including dialkyl ethers of ethylene glycol and aliphatic polyethers such as diethylene glycol dimethyl ether and diethylene glycol diethyl ether.

An important aspect of the present invention is to control the microstructure or vinyl content of the conjugated diene in the selectively hydrogenated copolymer block B and in the softening modifier. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term, "vinyl" refers to the presence of a pendant vinyl group on the polymer chain. When referring to the use of butadiene as the conjugated diene, it is preferred that about 20 to about 85 mol percent of the condensed butadiene units in the copolymer block have 1,2 vinyl configuration as determined by proton NMR analysis. For selectively hydrogenated block copolymers, preferably about 30 to about 70 mol percent of the condensed butadiene units should have 1,2 configuration. This is effectively controlled by varying the relative amount of the microstructure modifying agent. Suitable ratios of microstructure agent to lithium are disclosed and taught in U.S. Pat. No. Re. 27,145, which disclosure is incorporated by reference.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Starting materials for preparing the novel selectively hydrogenated copolymers and softening modifiers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. In certain cases, it is preferred that the alkenyl arene used for the A blocks be alpha-methylstyrene or a mixture of alpha-methylstyrene and styrene. In that case, the end blocks will have a higher Tg or glass transition temperature. This is shown in Example 4 which follows.

The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

Other important starting materials for anionic co-polymerizations include one or more polymerization initiators. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

Polymerization conditions to prepare the copolymers of the present invention are typically similar to those used for anionic polymerizations in general. In the present invention polymerization is preferably carried out at a temperature of from about −30° to about 150° C., more preferably about 10° to about 100° C., and most preferably, in view of industrial limitations, about 30° to about 90° C. It is carried out in an inert atmosphere preferably nitrogen, and may also be accomplished under pressure within the range of from about 0.5 to about 10 bars. This polymerization generally requires less than about 12 hours, and can be accomplished in from about 5 minutes to about 5 hours, depending upon the temperature, the concentration of the monomer components, the molecular weight of the polymer and the amount of distribution agent that is employed.

In order to make a softening modifier having the appropriate polydispersity index (PDI), it is desirable to have multiple additions of both the initiator and the diene monomers in order to obtain polymers having a broader molecular weight distribution than in "normal" anionically polymerized polymers. A "normal" diene polymer, prepared by a single addition of an initiator that reacts rapidly (relative to propagation reactions) with the diene monomer will have a PDI of about 1.0 to 1.2. The preferred softening modifiers of the present invention have a PDI of between 1.5 and 3.0. The simplest way to increase polydispersity is to add multiple initiator charges, timed appropriately to insure that a significant amount of polymerization has occurred between each addition. This process leads to a multi-modal product, with the largest chains being formed from the first initiator charge, and the smallest from the last. Polydispersities up to 2.0 can also be obtained by carrying out the polymerization using a continuous feed of monomer and initiator in a back-mixed reactor such as a continually stirred tank reactor ("CSTR"). It is also possible to produce polymers with a larger polydispersity by employing initiators that react slowly, so that chains will be continually initiated during course of monomer consumption. A similar effect can be achieved by adding a chain transfer agent, which terminates the growth of some chains, while starting new chains, over the course of the polymerization reaction. An example of the latter approach is provided by the polymerizations of butadiene, initiated by n-butyllithium, in the presence of the potassium salt of p-methylphenol, described in X. Yang, Y. Wang and J. Jia, *J. Appl. Poly. Sci.*, 95, 1215-1219 (2005).

As used herein, "thermoplastic block copolymer" is defined as a block copolymer having at least a first block of one or more mono alkenyl arenes, such as styrene and a second block of a selectively hydrogenated polymer of one or more dienes. The method to prepare this thermoplastic block copolymer is via any of the methods generally known for block polymerizations. The present invention includes as an embodiment a thermoplastic copolymer composition, which may be a di-block, tri-block copolymer, tetra-block copolymer or multi-block composition. In the case of the di-block copolymer composition, one block is the alkenyl arene-based homopolymer block and polymerized therewith is a second block of a selectively hydrogenated polymer of diene. In the case of the tri-block composition, it comprises, as end-blocks the glassy alkenyl arene-based homopolymer and as a mid-block the selectively hydrogenated diene. Where a tri-block copolymer composition is prepared, the selectively hydrogenated diene polymer can be herein designated as "B" and the alkenyl arene-based homopolymer designated as "A". The A-B-A, tri-block compositions can be made by either sequential polymerization or coupling. In addition to the linear, A-B-A configuration, the blocks can be structured to form a radial (branched) polymer, $(A-B)_nX$, or both types of structures can be combined in a mixture. Some A-B diblock polymer can be present but preferably at least about 70 weight percent of the block copolymer is A-B-A or radial (or otherwise branched so as to have 2 or more terminal resinous blocks per molecule) so as to impart strength.

Preparation of radial (branched) polymers requires a post-polymerization step called "coupling". It is possible to have either a branched selectively hydrogenated block copolymer and/or a branched tailored softening modifier. In the above radial formula for the selectively hydrogenated block copolymer, n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene. Preferred are tetra-alkoxysilanes such as tetra-ethoxysilane (TEOS), aliphatic diesters such as dimethyl adipate and diethyl adipate, and diglycidyl aromatic epoxy compounds such as diglycidyl ethers deriving from the reaction of bis-phenol A and epichlorohydrin.

Additional possible post-polymerization treatments that can be used to further modify the configuration of the polymers includes chain-termination. Chain termination simply prevents further polymerization and thus prevents molecular weight growth beyond a desired point. This is accomplished via the deactivation of active metal atoms, particularly active alkali metal atoms, and more preferably the active lithium atoms remaining when all of the monomer has been polymerized. Effective chain termination agents include water; alcohols such as methanol, ethanol, isopropanol, 2-ethylhexanol, mixtures thereof and the like; and carboxylic acids such as formic acid, acetic acid, maleic acid, mixtures thereof and the like. See, for example, U.S. Pat. No. 4,788,361, the disclosure of which is incorporated herein by reference. Other compounds are known in the prior art to deactivate the active or living metal atom sites, and any of these known compounds may also be used.

It is also important to control the molecular weight of the various blocks. As used herein, the term "molecular weight" refers to the true molecular weight in g/mol of the polymer of block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

4. Separate Reactor Process to Make Components

One alternative to prepare the in-situ compositions of the present invention is to polymerize the tailored softening modifier separately from the selectively hydrogenated block copolymer in a separate reactor. The following alternatives are thus possible:

a) Addition of the Tailored Softening Modifier Solution before or During the Preparation of the Selectively Hydrogenated Block Copolymer.

Optionally, the solution of tailored softening modifier in its polymerization solvent could be used as the solvent for the synthesis of the selectively hydrogenated block copolymer. Because the tailored modifier may be low in molecular weight (relative to the entanglement molecular weight for polymer), it is possible to select conditions such that it will contribute little to the solution viscosity of the blend. Solution viscosity is often the limiting factor affecting the amount of block copolymer that can be prepared in a batch polymerization process. In this scheme, the tailored softening modifier is in essence replacing some of the solvent that would have been used had the selectively hydrogenated block copolymer been made in the usual way. When the solution of the blend is finished, more product, base block copolymer plus modifier, will be generated per pound of solution than would have been realized had the base block copolymer been prepared in the normal way. The efficiency of the polymerization process has been enhanced.

b) Addition of Tailored Softening Modifier Solution after the Preparation of the Base Block Copolymer.

The selectively hydrogenated block copolymer might be prepared before the addition of the solution of the tailored softening modifier and the two streams could be blended prior to other polymer treatment steps such as hydrogenation, or wash or addition of antioxidants. Such a process would benefit from not having to apply these post-polymerization techniques to two separate streams.

c) Addition of Tailored Softening Modifier Solution Just Prior to Finishing.

Even if the solutions of the selectively hydrogenated block copolymer and the tailored softening modifier are only combined immediately before the solvent removal step, this process benefits from the ease of being able to prepare the two components by the methods that are best suited to each of them. The two polymerization processes are not constrained to only those processing conditions that are compatible with both preparations. A robust process is envisioned. Also, a more energy efficient removal process may be realized since the blend would be at a higher solids content than the initial block copolymer solution itself.

d) Addition of Tailored Softening Modifier Solution to a Solution of Redissolved Selectively Hydrogenated Block Copolymer, and then Finishing In this example, a solid selectively hydrogenated block copolymer is redissolved in an appropriate solvent, and is then combined with the solution of the tailored softening modifier prior to finishing both materials together.

5. Single Reactor Process to Make Components

On the other hand, preparation of the tailored softening modifier and the selectively hydrogenated block copolymer in the same reactor obviates the need for a second polymerization vessel and the associated process control equipment. In this approach, equipment costs could be substantially reduced. Not wishing to be limited to the process concepts described below, the following examples are offered as illustrations of how this approach could be practiced.

a) Preparation of the Tailored Softening Modifier Prior to the Preparation of the Selectively Hydrogenated Block Copolymer.

This approach is essentially the same as outlined above for the case where the tailored softening modifier solution is used to replace part of the solvent for the preparation of the block copolymer. All of the efficiencies of that process would be realized with the added benefit that only one vessel would be used in the present example.

b) Preparation of the Tailored Softening Modifier During the Preparation of the B Block, where the B Block of the Selectively Hydrogenated Block Copolymer is Synthesized First.

In this approach, sufficient initiator would be added to start the polymerization of both the tailored modifier and the selectively hydrogenated block copolymer at the same time. When sufficient monomer had been polymerized (as controlled by programmed addition of the monomer or controlled by time of termination under a kinetically regulated scheme) to make tailored modifier of the desired molecular weight, the living chain ends for the tailored modifier portion of the mixture are terminated by addition of the appropriate amount of a protic moiety such as an alcohol. The remaining living chains being those of the incipient base block copolymer are allowed to continue polymerization to the completion of the first block of the copolymer. Addition of the second monomer(s), at that point, would allow the construction of a block copolymer using conventional techniques for the synthesis of such polymers (to include sequential addition of monomer methods, coupling chemistries, and various post polymerization techniques such as hydrogenation). This approach has all of the advantages of the first described method in this section, with the added bonus that one polymerization step has been eliminated so that a faster polymerization cycle time may be realized.

c) Preparation of the Tailored Softening Modifier During the Preparation of the B Block of the Selectively Hydrogenated Block Copolymer, where the B Block is Synthesized Last.

The converse of the above process is to make the tailored softening modifier during the last polymerization step for the selectively hydrogenated block copolymer. In this process, a second charge of the initiator species is added at an appropriate point in the last step of the polymerization of the selectively hydrogenated block copolymer to allow "re-initiation" of polymerization and sufficient propagation of the freshly initiated species to generate the tailored softening modifier of the desired molecular weight. The fresh batch of initiator could be charged to an on going polymerization at the right time to make the right molecule. Alternatively, a fresh charge of monomer could be added after the addition of the new initiator aliquot to allow polymerization of the tailored softening modifier and the completion of the polymerization of the selectively hydrogenated block copolymer. The solvent blend of the selectively hydrogenated block copolymer and the tailored modifier would then be terminated by the addition of an acid species and optionally hydrogenated. The resulting mixture could then be recovered from the solvent using the methods normally used to recover the selectively hydrogenated block copolymer. As described above, this approach could result in a faster polymerization cycle time as the tailored modifier is being prepared concurrently with the base block copolymer.

d) Preparation of the Tailored Softening Modifier After the Preparation of the Last Segment of the Selectively Hydrogenated Block Copolymer.

In this approach, the synthesis of the selectively hydrogenated block copolymer is completed and the living chain ends of the base block copolymer are terminated optionally by coupling, protonation, reaction with a capping agent, or chain transfer to an initiating species. At this point in the preparation, polymerization is reinitiated by addition of a suitable amount of initiating agent (could be in part or in total an activated chain transfer species). Sufficient monomer is added to complete the polymerization of the tailored modifier whereupon a terminating agent is added to complete the polymerization process. This approach has advantages similar to those outlined in the first example above, with the caveat that the preparation of the selectively hydrogenated block copolymer may be more straightforward (not contaminated with terminating agents and things of that sort). The blend of the tailored modifier and the selectively hydrogenated block copolymer could then be recovered from the solvent using any of the methods that are standard for the recovery of the selectively hydrogenated block copolymer.

6. Hydrogenation Step

After polymerization, both the selectively hydrogenated block copolymer and the tailored softening modifier are hydrogenated. The preferred hydrogenation is selective hydrogenation of the diene portions of the final block copolymer and tailored softening. modifier. Hydrogenation generally improves thermal stability, ultraviolet light stability, oxidative stability, and, therefore, weatherability of the final polymer.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and U.S. Pat. No. Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

Once the hydrogenation is complete, it is preferable to extract the catalyst by stirring with the polymer solution a relatively large amount of aqueous acid (preferably 20-30 percent by weight), at a volume ratio of about 0.5 parts aqueous acid to 1 part polymer solution. Suitable acids include phosphoric acid, sulfuric acid and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

As described above, the selectively hydrogenated block copolymer can be independently hydrogenated, and then blended with the solution containing the tailored softening modifier prior to solvent removal, or blended post polymerization and hydrogenated in a single batch. In addition, it is possible to use an unhydrogenated tailored softening modifier with the selectively hydrogenated block copolymer. A benefit of incorporating an unhydrogenated TSM with a selectively hydrogenated copolymer would include increasing the reactivity of the hydrogenated copolymer in formulations where higher reactivity is desired (e.g., crosslinking).

7. Finishing Step

The last step, following all polymerization(s) as well as the hydrogenation step, is a finishing treatment to remove the final polymers from the solvent. Various means and methods are known to those skilled in the art, and include use of steam to evaporate the solvent, and coagulation of the polymer followed by filtration. The final result is a "clean" block copolymer composition useful for a wide variety of challenging applications, according to the properties thereof.

8. End-Uses and Applications

The polymer compositions of the present invention are useful in a wide variety of applications. The following is a partial list of the many potential end uses or applications: over molding, personal hygiene, molded and extruded goods, barrier films, packaging, closures such as synthetic corks and cap seals, tubing, footwear, containers including containers for food or beverages, interior automotive applications, window gaskets, oil gels, foamed products, fibers including bicomponent and monofilament, adhesives, cosmetics and medical goods.

Finally, the copolymer compositions of the present invention can be compounded with other components not adversely affecting the copolymer properties. Exemplary materials that could be used as additional components would include, without limitation, pigments, antioxidants, stabilizers, surfactants, waxes, flow promoters, traditional processing oils, solvents, particulates, and materials added to enhance processability and pellet handling of the composition. In addition, the copolymer compositions can be further formulated with other polymers, including by way of illustration and not limitation, polyolefins (e.g., propylene homopolymers and copolymers, ethylene homopolymers and copolymers and butylene homopolymers and copolymers), styrene polymers (e.g., polystyrene homopolymers, HIPS, ABS, SAN), engineering thermoplastics, polyurethanes, polyamides, polycarbonates, polyesters, functionalized polymers (e.g., maleated PP, maleated S-EB-S), styrene diene block copolymers (e.g. S-I-S, S-B-S, S-I/B-S) hydrogenated styrene diene block copolymers (e.g. S-EB-S, S-EP-S, S-EP, S-EB) and the like.

The following examples are intended to be illustrative only, and are not intended to be, nor should they be construed as being, limitative in any way of the scope of the present invention

EXAMPLE #1A

A series of tailored softening modifiers (TSM) were prepared by anionic polymerization of butadiene in the presence of diethyl ether, a microstructure control agent. The unsaturated polymers were hydrogenated using a Ni/Al technique. The spent hydrogenation catalyst residues were removed from the solution containing the saturated TSM by oxidation of the Ni and extraction of the inorganic salts with an aqueous acid solution.

A representative tailored, softening modifier, TSM-8, was made under standard anionic polymerization conditions by initiating the reaction of butadiene (0.4 kg) at 25° C. with s-butyllithium (38 g of a 14% wt solution) in the presence of a microstructure control agent, diethyl ether (121 g), using cyclohexane (0.34 gal) as a solvent. The polymerization temperature was allowed to increase to about 80° C. When the polymerization was complete (about 20 min), the reaction was terminated with about 3 g of methanol. A second aliquot of butadiene monomer (0.4 kg) was charged to the freshly prepared (and terminated) polybutadiene solution and polymerization was reinitiated by the addition of a second charge of s-butyl-lithium (37 g of a 14% wt solution). The second phase of the polymerization reaction was controlled between 20 to 50° C. When polymerization was complete, the living polymer chain ends were terminated by the addition of about 3 g of methanol.

This polymer was then hydrogenated to a residual unsaturation of about 0.2 milli-equivalents olefin/gram using a Ni/Al catalyst (about 150 ppm Ni) at around 700 psi hydrogen and temperatures up to about 85° C. The catalyst was oxidized and extracted by contacting the cement with aqueous phosphoric acid while sparging with an $N_2/O_2$ gas blend. The cement was then washed with distilled water (while sparging with $N_2/O_2$) until the cement was neutral (as tested using wet pH paper). The TSM-8 solids content of the solution at this point was just over 40% wt.

Using related anionic polymerization techniques and hydrogenation methods but differing amounts of the reagents, the "E/B" tailored softening modifiers described in Table 1 were prepared in separate reactors.

EXAMPLE #1B

A series of tailored softening modifiers (TSM) were prepared by anionic polymerization of isoprene. The unsaturated polymers were hydrogenated using a Ni/Al technique. The spent hydrogenation catalyst residues were removed from the solution containing the saturated TSM by oxidation of the Ni and extraction of the inorganic salts with an aqueous acid solution.

A representative tailored softening modifier, TSM-13, was made under standard anionic polymerization conditions by initiating the reaction of isoprene (0.4 kg) at 25° C. with s-butyllithium (38 g of a 14% wt solution) in the presence of a microstructure control agent, diethyl ether (121 g), using cyclohexane (0.34 gal) as a solvent. The polymerization temperature was allowed to increase to about 80° C. When the polymerization was complete (about 20 min), the reaction was terminated with about 3 g of methanol. A second aliquot of butadiene monomer (0.4 kg) was charged to the freshly prepared (and terminated) polybutadiene solution and polymerization was reinitiated by the addition of a second charge of s-butyllithium (37 g of a 14% wt solution). The second phase of the polymerization reaction was controlled between 20 to 50° C. When polymerization was complete, the living polymer chain ends were terminated by the addition of about 3 g of methanol. An aliquot of the polymer solution (1985 g) was centrifuged to remove insoluble residues (likely lithium salts). This polymer solution was then hydrogenated using a Ni/Al catalyst (about 100 ppm Ni) at around 700 psi hydrogen and temperatures up to about 70° C. An aliquot of TSM-13 was removed from the product solution and was found to have a residual unsaturation level of about 0.02 milli-equivalents olefin/gram The catalyst in the remained of the saturated polymer solution was oxidized and extracted by contacting the cement with aqueous phosphoric acid while sparging with an $N_2/O_2$ gas blend. The cement was then washed with distilled water (while sparging with $N_2/O_2$) until the cement was neutral (as tested using wet pH paper). The TSM-13 solids content of the solution at this point was about 10% wt.

Using related anionic polymerization techniques and hydrogenation methods but differing amounts of the reagents, the "E/P" tailored softening modifiers described in Table 1 were prepared in separate reactors. TSM's 2, 6, 7 and 10 are not according to the claimed invention.

TABLE 1

Tailored Softening Modifiers Prepared Separately.

| Sample | EB or EP | MW (kg/mol) | Vinyl (%) | Polydispersity Index |
|---|---|---|---|---|
| TSM-1A | EB | 6300 | 38 | 1.02 |
| TSM-1B | EB | 5300 | 38 | 1.08 |
| TSM-2* | EB | 9800 | 41 | 1.12 |
| TSM-3 | EP | 6300 | 7.1 | 1.13 |
| TSM-4 | EB | 3300 | 40 | |
| TSM-5 | EB | 3800 | 49 | 1.2 |
| TSM-6* | EB | 26000 | 41 | 1.15 |
| TSM-7* | EB | 11000 | 43 | 1.04 |
| TSM-8 | EB | 5300 | 42 | 1.07 |
| TSM-9 | EB | 2400 | 47 | 1.05 |
| TSM-10* | EB | 1400 | 46 | 1.23 |
| TSM-11 | EB | 6800 | 38 | 1.57 |
| TSM-12 | EB | 13000 | 38 | 1.7 |
| TSM-13 | EP | 6700 | 6 | 1.35 | where "MW" = peak molecular weight as measured by Gel Permeation Chromatography using polystyrene as a calibration standard, "Vinyl" = the portion of the butadiene that was polymerized by 1,2-addition and is measured using an H-NMR method, polydispersity index (PDI) is the ratio of the weight average molecular weight divided by the number average molecular weight.

TABLE 2

Selectively Hydrogenated Block Copolymers (SHBC)

| | |
|---|---|
| G-1650 | Selectively hydrogenated S-EB-S block copolymer with 30% w. styrene content, and a vinyl content of butadiene prior to hydrogenation of 38%, as supplied by KRATON Polymers |
| G-1651 | Selectively hydrogenated S-EB-S block copolymer with 33% w. styrene content, vinyl content of butadiene prior to hydrogenation of 38%, as supplied by KRATON Polymers. |
| MD-6933 | Selectively hydrogenated S-EB-S block copolymer with 30% w. styrene content, vinyl content of butadiene prior to hydrogenation of 40%, as supplied by KRATON Polymers. |
| RP-6926 | Selectively hydrogenated S-EB-S block copolymer with 20% w. styrene content, true molecular weight of 161,000 and a vinyl content of the butadiene prior to hydrogenation of 38%, as supplied by KRATON Polymers. |
| G-1657 | Selectively hydrogenated S-EB-S block copolymer with 13% w. styrene content, true molecular weight of 148,000 and vinyl content of butadiene of 42%, as supplied by KRATON Polymers |
| G-1730 | Selectively hydrogenated S-EP-S block copolymer with 20% w. styrene content as supplied by KRATON Polymers. |

Various blends of Tailored Softening Modifiers and Selectively Hydrogenated Block Copolymers were prepared according to the following general procedure: The specified quantity of Selectively Hydrogenated Block Copolymer and TSM were added to a Cowles high shear dissolver, along with a certain amount of cyclohexane, in order to form a solution containing about 9 to 13% weight solids. The resulting mixture was then heated to about 90° C., and allowed to mix at about 1400 RPM for 60 to 120 minutes. The solvent was then stripped in a cyclone and the blend recovered as crumb. The resulting blends are shown below in Table #3, and are then used in the following examples.

TABLE 3

| Blend# | SHBC# | TSM# | TSM (phr) |
|---|---|---|---|
| 1 | MD-6933 | 1A | 50 |
| 2 | G-1651 | 1B | 100 |
| 3 | G-1651 | 1B | 50 |
| 4 | G-1651 | 11 | 50 |
| 5 | G-1651 | 12 | 50 |

The following materials were used in the examples that follow:
- KLP 1203—hydrogenated polybutadiene having on average of one OH group per molecule and a molecular weight of about 3,000, as supplied by KRATON Polymers
- Primol 352 oil—a paraffinic mineral oil supplied by Esso.
- PP HP501L—6 melt flow polypropylene homopolymer supplied by Basell
- PP HP501N—15 melt flow polypropylene homopolymer supplied by Moplen
- PP 5A15H—5 melt flow polypropylene homopolymer from Dow Chemical
- Kristallex 5140—an endblock resin supplied by Eastman Chemical.
- Durcal 5—5 micron calcium carbonate supplied by Omya
- PP 5E63—12 melt flow polypropylene homopolymer supplied by/Dow Chemical
- Drakeol 34—a paraffinic mineral oil supplied by Penreco
- Penrico 4434—a paraffinic mineral oil supplied by Penreco
- PE NA601—low density polyethylene

EXAMPLE #2

Various compounds were prepared with Selectively Hydrogenated Block Copolymers and Tailored Softening Modifiers. These formulations are compared to formulations containing traditional oil without the presence of such TSMs. The various formulations and results are shown below in Table 4.

Fogging:
The completely oil-free compounds 2.2 (MD-6933+TSM-1A+KLP 1203) and 2.4 (G-1651 with TSM-1B) show excellent fogging results (>>90%), which is in-line with the more precise measurement of weight loss after 4 weeks heat aging at 120° C. The compounds with mixed TSM and oil have worse fogging, but better than the reference 2.6.

Compression Set:
Improved high temperature performance is measured via compression set, and the improvement is clear. The first step is to change the base polymer from G-1651 (2.6) to MD-6933 (2.5) which results in 10 and 15% improved compression set at 100° C. and 120° C. Replacing part of the oil in the MD-6933 compounds (2.5 and 2.1) with TSM results in another 10 and 15% improvement of Compression Set (CS) at 100 and 120° C.

Mechanical Properties:
The compound hardness is not affected by the change of base polymer or replacement of oil by TSM and KLP. The tensile properties indicate that the presence of TSM reduces elongation at break and tensile strength and slightly increases the modulus. But the mechanical properties are still suitable for most applications.

Spiral Flow:
Spiral flow can predict the processing behavior during injection molding. The results show that there are significant reductions (30%) in spiral flow length if the oil is replaced by TSM. The DSC measurements indicate that normal oil is a plasticizer for the PP-phase, while this does not occur with TSM. The result is a reduced flow with TSM, but still acceptable for the injection molding process.

EXAMPLE #3

Various formulations were prepared for typical filled automotive applications. Results are shown below in Table 5.

Fogging:
There is a clear relationship between the oil content of the compounds and fogging. Values >95% are achieved for filled compounds based on G-1651 and MD-6933 with an effective oil-content of 14.3% w (=50 phr oil). An increase of the oil content to 28.6% w (100 phr oil) results in fogging values of 92% and the compounds without TSM and 42.8% oil show fogging values <90%. The fogging values are in good agreement with the values found for the weight loss after 4 weeks aging at 120° C.

Compression Set:
As expected the filled compound based on MD-6933 shows superior compression set values than the compounds based on G-1651. In fact the MD-6933/oil/PP/filler compounds match the performance of G-1651/100 TSM/50 Oil/PP/filler.

Mechanical Properties:
All compounds show almost identical hardness values. There is no effect of the base polymer or of the oil/TSM ratio in the compounds. As the TSM fraction increases the modulus increases slightly, while the tensile strength and the elongation at break decrease slightly. But the mechanical properties are still at a very high level and fully acceptable for automotive applications.

Melt-Flow/Spiral Flow:
Due to higher plasticizer level of the filled compounds the MFR is measurable. The trend is as expected. An increasing level of TSM decreases the MFR, and also the change of the base polymer from G-1651 to MD-6933 results in a lower MFR. But again, spiral flow results give a better prediction for the behavior in the injection molding process. All compounds show very acceptable spiral flow lengths under normal injection molding conditions. Spiral flow lengths are related to the base polymer and the oil/TSM ratio.

TABLE #4

|  |  | Compound number | | | | | |
|---|---|---|---|---|---|---|---|
|  |  | 2.1 | 2.2 | 2.3 | 2.4 | 2.5 | 2.6 |
| Blend #1 | phr | 150 | 150 |  |  |  |  |
| MD-6933 | phr |  |  |  |  | 100 |  |
| Blend #2 | phr |  |  |  | 200 |  |  |
| Blend #3 | phr |  |  | 150 |  |  |  |
| G-1651 | phr |  |  |  |  |  | 100 |
| Primol 352 oil | phr | 50 |  | 50 |  | 100 | 100 |
| KLP 1203 | phr |  | 50 |  |  |  |  |
| PP HP501L | phr | 34 | 34 | 34 | 34 | 34 | 34 |

TABLE #4-continued

|  |  | Compound number | | | | | |
|---|---|---|---|---|---|---|---|
|  |  | 2.1 | 2.2 | 2.3 | 2.4 | 2.5 | 2.6 |
| Additives | phr | 1 | 1 | 0.4 | 0.4 | 0.4 | 0.4 |
| Fogging DIN 75201 A | % | 84 | 94 | 73 | 98 | nm | 65 |
| Weight change 4 wk/120° C. | % w | −2.0 | 0.3 | −2.0 | 0.5 | nm | −3.0 |
| Compression set 24 h |  |  |  |  |  |  |  |
| 70° C. | % | 32 | 29 | 33 | 30 | 35 | 36 |
| 100° C. | % | 38 | 39 | 47 | 41 | 47 | 58 |
| 120° C. | % | 42 | 43 | 56 | 49 | 56 | 69 |
| DSC |  |  |  |  |  |  |  |
| Melting temperature of PP | ° C. | nm | nm | 156 | 162 | nm | 151 |
| Hardness Shore A |  |  |  |  |  |  |  |
| 30 sec |  | 58 | 59 | 61 | 63 | 60 | 60 |
| Tensile properties |  |  |  |  |  |  |  |
| Modulus 300% MD | MPa | — | — | 3.8 | 4.3 | nm | 3.6 |
| Modulus 300% PMD | MPa | 3.1 | 3.2 | 2.9 | 3.3 | nm | 2.4 |
| Tensile Strength MD | MPa | 4.1 | 4.2 | 4.1 | 4.1 | 4.9 | 4.2 |
| Tensile Strength PMD | MPa | 8.3 | 8.2 | 9.1 | 9.1 | 14.7 | 12.6 |
| Elongation MD | % | 272 | 240 | 400 | 300 | 260 | 500 |
| Elongation PMD | % | 630 | 626 | 700 | 650 | 850 | 900 |
| Spiral flow | (200° C.) |  |  |  |  |  |  |
| 500 bar | degree | 310 | 310 | 310 | 290 | nm | 400 |
| 750 bar | degree | 460 | 450 | 470 | 420 | nm | 580 |
| 1000 bar | degree | 580 | 560 | 610 | 530 | nm | 720 |

TABLE #5

|  |  | Compound number | | | | | | |
|---|---|---|---|---|---|---|---|---|
|  |  | 3.1 | 3.2 | 3.3 | 3.4 | 3.5 | 3.6 | 3.7 |
| G1651ES | phr | 100 |  |  |  |  |  |  |
| MD6933ES | phr |  | 100 |  |  |  |  |  |
| Blend #1 | phr |  |  | 150 | 150 |  |  |  |
| Blend #2 | phr |  |  |  |  | 200 |  |  |
| Blend #3 | phr |  |  |  |  |  | 150 | 150 |
| Primol 352 oil | phr | 150 | 150 | 100 | 50 | 50 | 100 | 50 |
| KLP 1203 | phr |  |  |  | 50 |  |  | 50 |
| PP HP501L | phr | 40 | 40 | 40 | 40 | 40 | 40 | 40 |
| Durcal 5 | phr | 60 | 60 | 60 | 60 | 60 | 60 | 60 |
| Additives | phr | 1 | 1 | 1 | 1 | 1 | 1 | 1 |
| Fogging DIN 75201 A | % | 84 | 88 | 92 | 96 | 96 | 94 | 97 |
| Weight loss 4 wk/120° C. | % w | 6.0 | 4.0 | 3.1 | 1.5 | 1.7 | 3.4 | 1.8 |
| Oil content in formulation | % w | 42.8 | 42.8 | 28.6 | 14.3 | 14.3 | 28.6 | 14.3 |
| In-situ + KLP content | % w | 0.0 | 0.0 | 14.3 | 28.6 | 28.6 | 14.3 | 28.6 |
| Compression set 24 h |  |  |  |  |  |  |  |  |
| 70° C. | % | 42 | 34 | 31 | 30 | 28 | 31 | 29 |
| 100° C. | % | 63 | 45 | 43 | 41 | 43 | 49 | 44 |
| 120° C. | % | 75 | 52 | 48 | 46 | 52 | 60 | 53 |
| Hardness Shore A |  |  |  |  |  |  |  |  |
| 30 sec |  | 52 | 52 | 52 | 53 | 55 | 53 | 53 |
| Tensile properties |  |  |  |  |  |  |  |  |
| Modulus 300% MD | MPa | 3.0 | 2.8 | 3.2 | 3.4 | 3.2 | 2.7 | 2.2 |
| Modulus 300% PMD | MPa | 2.1 | 2.1 | 2.2 | 2.3 | 2.3 | 2.1 | 2.1 |
| Tensile Strength MD | MPa | 4.5 | 6.4 | 4.5 | 5.0 | 4.4 | 4.9 | 4.8 |
| Tensile Strength PMD | MPa | 10.5 | 10.1 | 8.0 | 8.3 | 7.4 | 9.0 | 8.1 |
| Elongation MD | % | 720 | 765 | 528 | 524 | 560 | 690 | 627 |
| Elongation PMD | % | 960 | 908 | 817 | 825 | 811 | 906 | 846 |
| Melt flow rate |  |  |  |  |  |  |  |  |
| MFR 230° C., 5 kg | g/10 min | 90 | 35 | 20 | 15 | 45 | 70 | 45 |
| MFR 200° C., 5 kg | g/10 min | 25 | 10 | 6 | 4 | 16 | 23 | 18 |
| Spiral flow | (200° C.) |  |  |  |  |  |  |  |
| 500 bar | degree | 490 | 440 | 410 | 380 | 390 | 430 | 420 |
| 750 bar | degree | 660 | 620 | 570 | 540 | 550 | 600 | 570 |
| 1000 bar | degree | 810 | 740 | 710 | 670 | 670 | 750 | 710 |

EXAMPLE #4

In Example #4, a selectively hydrogenated block copolymer (SHBC 8766) containing styrene/α-methyl styrene end blocks and a hydrogenated butadiene mid block were prepared using a methyl trimethoxy silane coupling agent as follows. 0.9 kg of cyclohexane, 0.12 kg of diethyl ether and 0.43 kg of alpha-methylstyrene ("aMSt") were charged to a to a stainless steel autoclave, and the reaction temperature was adjusted to 40° C. About 150 milliliters of a 4.3 g/milliliter solution of s-butyl lithium in cyclohexane was added, and 0.57 kg of styrene was added over a 30 minute period, at 40° C. About 10 minutes after the styrene addition was complete, 0.33 kg of this solution was transferred to a second reactor containing 2.8 kg cyclohexane, 0.22 kg diethyl ether and 0.064 kg butadiene, which had been purified by titration. An additional 0.53 kg of butadiene was added over about a 20 minute period; the reaction temperature was maintained at about 60° C. Following reaction of the butadiene, 0.75 g of methyltrimethoxysilane (MTMS, about 0.45 moles per mole of live chains) was added to couple the living diblock polymer chains. This reaction was allowed to proceed for about 60 minutes, and then methanol was added to terminate any uncoupled chains. The resulting polymer was analyzed by GPC and $^1$H NMR; $^1$H NMR of the cement was used to estimate concentration of unreacted aMSt monomer in the first reactor. This data was used to estimate the aMSt content of the St/aMSt block. The resulting polymer was comprised of a St/aMSt block with a molecular weight of about 11.6 kg/mole, and a aMSt content of about 41% wt. The diblock produced in the second step had a molecular weight of about 55 kg/mole and a butadiene vinyl content of 38%. The UV areas in the GPC chromatogram are consistent with about 90% of the transferred copolymer chains adding butadiene to produce the desired diblock. The remainder was terminated at some point during the copolymerization or transfer. GPC of the coupled product indicates about 78% of the chains coupled; about 40% of those were linear, the majority of the remainder was 3-arm (radial) copolymers. This polymer was selectively hydrogenated to a residual diene unsaturation of about 0.55 milli-equivalents olefin/gran using a Co/Al catalyst (about 40 ppm Co) at around 700 psi hydrogen and temperatures up to about 75° C. The catalyst was oxidized and extracted by contacting the cement with aqueous phosphoric acid while sparging with an $N_2/O_2$ gas blend. The cement was then washed with distilled water (while sparging with $N_2/O_2$) until the cement was neutral (as tested using wet pH paper). The polymers were then recovered by hot water coagulation. The resulting polymer—SHBC # 8766—was then compounded with various other components and evaluated. The formulations are shown in Table #6 and the results in Table #7 below.

TABLE #6

| | Sample No. | | | | | | |
|---|---|---|---|---|---|---|---|
| | 4-1-ref | 4-2 | 4-3 | 4-4 | 4-5 | 4-6 | 4-7 |
| KG-1650, pbw | 100 | 100 | | | | | |
| SHBC-8766, pbw | | | 100 | 100 | 100 | | |
| RP-6926, pbw | | | | | | 100 | 100 |
| Primol 352, pbw | 50 | | 50 | | | 50 | |
| TSM-5, pbw | | 50 | | 57 | 50 | | 50 |
| Moplen HP501N, pbw | 35 | 35 | 35 | 35 | | 35 | 35 |
| Kristallex 5140, pbw | | | | | 35 | | |
| Additives, pbw | 0.4 | 0.4 | 0.4 | 0.4 | 0.4 | 0.4 | 0.4 |

TABLE #7

| | Sample No. | | | | |
|---|---|---|---|---|---|
| | 4-1-ref | 4-2 | 4-3 | 4-4 | 4-5 |
| Hardness 0 s-30 s | 71-69 | 74-71 | 68-65 | 67-63 | 40-36 |
| Compression Set 24 hours 55° C. | 77 | 50 | 61 | 37 | 31 |
| Compression Set 24 hours 70° C. | 100 | 76 | 85 | 51 | 49 |
| Compression Set 24 hours 85° C. | >100 | 95 | 99 | 71 | 72 |
| Torque/Melt Temp./° C. | 8/203 | 11/205 | 11/203 | 16/205 | 14/208 |

EXAMPLE #5

In Example #5, various formulations containing G-1657 and a hydrogenated polybutadiene TSM (low mol weight EB, TSM-2) and G-1730 and a hydrogenated polyisoprene TSM (low mol weight EP, TSM-3) were compared against formulations containing the block copolymers and a normal extending oil (Drakeol 34). Formulations were prepared in a Brabender mixing head at 210° C. The results, shown below in Table #8 show that the addition of TSM 2 to G-1657 and TSM-3 to G-1730 significantly increases tensile strength and elongation to break compared to the normal process oil without changing the modulus at 100%, 300% or 500% elongation. However, it is likely that oil bleed out will be more of a problem with the higher mol weight TSM-2.

TABLE #8

| | Sample No. | | | | | |
|---|---|---|---|---|---|---|
| | 5.1 Percent | 5.2 Percent | 5.3 Percent | 5.4 Percent | 5.5 Percent | 5.6 Percent |
| G-1657 | 70 | 70 | 0 | 0 | 0 | 0 |
| G-1730 | 0 | 0 | 70 | 70 | 90 | 90 |
| Drakeoil 34 | 20 | | 20 | | 10 | |
| TSM-2 | | 20 | | | | |
| TSM-3 | | | | 20 | | 10 |
| PE NA601 | 10 | 10 | 10 | 10 | 0 | 0 |
| PROPERTIES Stress-Strain | | | | | | |
| Max. Stress at Break, psi | 700 | 811 | 475 | 849 | 1061 | 1555 |
| Strain at Break, % | 902 | 1157 | 614 | 898 | 898 | 1027 |
| Stress at 50%, psi | 113 | | 98 | | 133 | |
| Stress at 100%, psi | 141 | 137 | 123 | 120 | 168 | 156 |
| Stress at 200%, psi | 172 | | 162 | | 221 | |
| Stress at 300%, psi | 207 | 209 | 209 | 209 | 290 | 279 |
| Stress at 500%, psi | 316 | 318 | 352 | 378 | 514 | 531 |

EXAMPLE #6

In Example #6, formulations containing KRATON G-1650, oil or TSM, and polypropylene are compared. Formulation 6-2 is the control, showing the results with G-1650, a normal extending oil and polypropylene, while Formulation 6-1 is according to the present invention and contains G-1650, TSM-5 and polypropylene. As shown in Table 9 below, the addition of TSM-5 as a replacement for the normal extending oil dramatically improved tensile strength and elongation to break. Even more striking is the reduction in compression set at 70° C. The control exhibits 98% set which means it completely relaxes, whereas the same composition made with TSM-5 relaxes only 67%.

TABLE 9

| | FORMULATION | |
|---|---|---|
| | 6-1 Percent wt. | 6-2 Percent wt. |
| G-1650 | 44.5 | 44.5 |
| TSM-5 | 37 | 0 |
| Penrico 4434 oil | 0 | 37 |
| PP 3622 | 18.5 | 18.5 |
| Max. Stress at Break, psi | 600 | 470 |
| Strain at Break, % | 440 | 250 |
| Stress at 100%, psi | 280 | 370 |
| Compression Set @ 70 C, % | 67 | 98 |
| Hardness (reading @ 10 sec) | 60.5 | 59 |

EXAMPLE #7

In Example #7, blends of TSMs of varying molecular weight and a selectively hydrogenated S-EB-S-EB tetrablock were compounded and results are shown in Table #10 below. The tetrablock (hydrogenated styrene/butadiene block copolymer) had mol weights of 7,000-65,000-8,500-6,500. The oil was Drakeol 34. The tetrablock was tested as a neat polymer, in a blend of 80 parts block copolymer and 20 parts oil, and in blends of 80 parts block copolymer and 20 parts TSM. In all cases the TSM was a hydrogenated polybutadiene. The molecular weights of the TSMs used are shown below. TSM's 6 and 7 are not according to the invention. The films were cast from 80/20 polymer/TSM blends dissolved in cyclohexane. The cast films were compression-molded into thinner (about 15 mil) films for tensile testing. The oil composition was prepared in a Brabender mixer and compression-molded into a 15 mil think film for testing.

TSM-6, MW=25.8K
TSM-7, MW=11.1K
TSM-8, MW=5.3K
TSM-9, MW=2.4K
TSM-10, MW=1.4K

As shown in Table 10 below, that the addition of TSM 7, 8, 9 or 10 gives much higher strength compared to the oiled control. Addition of the TSM's allows the modulus and viscosity of the homopolymer to be reduced to a desired level while still retaining tensile strength and elongation comparable to that of the neat polymer.

TABLE #10

| | Oil or TSM | | | | | | |
|---|---|---|---|---|---|---|---|
| | Neat | Drakeol | TSM-6 | TSM-7 | TSM-8 | TSM-9 | TSM-10 |
| Properties: Stress-Strain | | | | | | | |
| Max. Stress, psi | 4533 | 3104 | 4085 | 4936 | 4489 | 4778 | 4685 |
| Ultimate elongation, % | 941 | 1211 | 1117 | 1183 | 1160 | 1194 | 1208 |
| 50% modulus, psi | 204 | 131 | 121 | 101 | 100 | 96 | 104 |
| 100% modulus, psi | 255 | 165 | 162 | 139 | 141 | 134 | 144 |
| 200% modulus, psi | 360 | 205 | 221 | 195 | 191 | 186 | 193 |
| 300% modulus, psi | 503 | 270 | 300 | 266 | 258 | 251 | 259 |
| 500% modulus, psi | 962 | 489 | 546 | 523 | 477 | 494 | 474 |
| | 2 pulled out, 2 broke | all broke | all pulled out | 4 pulled out, 1 broke | 2 pulled out, 2 broke | all pulled out | all pulled out |
| Viscosity at 250 C. (cps) | 3.50E+06 | 7.50E+05 | 2.50E+06 | 2.00E+06 | 1.70E+05 | 1.20E+06 | 9.50E+05 |

In addition, the various TSMs were compounded with G-1650 S-EB-S block copolymer and polypropylene, as shown below in Table #11. As shown in Table 11 the addition of the TSM 6, 7 and 8 greatly improve compression set while improving tensile strength. As the molecular weight of the TSM is reduced, tensile strength is increased, but compression set is increased. TSM-8 offers the best balance of properties for this composition. Compositions 7-3 and 7-4, containing TSM-7 and TSM-6 respectively, have stress at break that is not much improved over compositions with oil. Further, compositions 7-3 and 7-4 were white, indicating that the compositions were inhomogeneous and subject to bleed out.

TABLE #11

| | Sample No. | | | | |
|---|---|---|---|---|---|
| | 7-1 | 7-2 | 7-3 | 7-4 | 7-5 |
| | | | Oil or TSM | | |
| | TSM-9 Percent | TSM-8 Percent | TSM-7 Percent | TSM-6 Percent | Oil Percent |
| G1650 | 42.7 | 42.7 | 42.7 | 42.7 | 42.7 |
| TSM | 42.7 | 42.7 | 42.7 | 42.7 | |
| Penrico 4434 (Drakeol 34) | 0 | 0 | 0 | 0 | 42.7 |
| Fina PP 3622 (MFI = 28) | 14.5 | 14.5 | 14.5 | 14.5 | 14.5 |
| Additive | 0.5 | 0.5 | 0.5 | 0.5 | 0.5 |
| PROPERTIES Stress-Strain | | | | | |
| Max. Stress at Break, psi | 1293 | 1132 | 782 | 606 | 409 |
| Strain at Break, % | 947 | 906 | 834 | 680 | 592 |
| Stress at 25%, psi | 95 | 108 | 118 | 115 | 63 |

TABLE #11-continued

| | Sample No. | | | | |
|---|---|---|---|---|---|
| | 7-1 | 7-2 | 7-3 | 7-4 | 7-5 |
| | \multicolumn{5}{c}{Oil or TSM} | | | | |
| | TSM-9 Percent | TSM-8 Percent | TSM-7 Percent | TSM-6 Percent | Oil Percent |
| Stress at 50%, psi | 143 | 154 | 162 | 132 | 97 |
| Stress at 100%, psi | 210 | 218 | 202 | 150 | 145 |
| Stress at 200%, psi | 309 | 310 | 240 | 195 | 229 |
| Stress at 300%, psi | 389 | 382 | 283 | 255 | 280 |
| Stress at 500%, psi | 583 | 557 | 426 | 428 | 375 |
| Compression Set @ 22 hrs, 70° C., 30 min % | 100 | 77 | 73 | 70 | 100 |
| Melt Flow @ 200 C., 5 Kg | 43 | 15 | 14 | 11 | 136 |
| Hardness (Shore A) | 53 | 53 | 53 | 50 | 44 |

EXAMPLE #8

In Example #8, two different TSMs were used in two different formulations. Blend #4 contains TSM-11 which has a PDI of 1.6 and a peak number average molecular weight of 6,800, while Blend #5 contains TSM-12 that has a PDI of 1.7 and a peak number average molecular weight of 13,000. S-EB #1 is used in this example as a comparative softener and is a selectively hydrogenated styrene-butadiene diblock copolymer with a molecular weight of 64,000 g/mol and 16% polystyrene content. It is known that the addition of diblock can be used to achieve many of the same effects as that of oil such as flow promotion while reducing high temperature performance. The formulations used in this Example are shown in Tables 12 and 13 below. Formulations 8.4 and 8.8 both contain 66 phr of S-EB #1 so the EB portion remains at 50 phr for comparison.

In both formulations, Blends #4 and #5 result in compounds of similar hardness and stiffness while providing an improvement in compression set at all temperatures tested. This illustrates the effectiveness of TSM's of higher polydispersity. TSM-11 provides the most improvement in compression set. In both cases, S-EB #1 used for comparative purposes also results in formulations of similar hardness but offers no improvement in compression set. Oil bleed out (OBO) was evaluated after four weeks of heat aging at 120° C. Injection molded plaques were placed in an oven on Teflon coated aluminum foil. After four weeks at 120° C., the surface of the plaques was evaluated in addition to measuring weight loss. None of the formulations exhibited oil bleed out.

TABLE 12

| | Formulation Number | | | |
|---|---|---|---|---|
| | 8.1 | 8.2 | 8.3 | 8.4 |
| G1651H | 100 | | | 100 |
| Blend #4 | | 150 | | |
| Blend #5 | | | 150 | |
| S-EB #1 | | | | 66 |
| PP 5A15H | 34 | 34 | 34 | 34 |
| Drakeol 34 | 100 | 50 | 50 | 50 |
| Additives | 0.6 | 0.6 | 0.6 | 0.6 |
| MFR @ 230° C./5 kg, g/10' | 4.7 | 3.9 | 3.9 | N/A |
| Hardness, 10 s | 58 | 56 | 53 | 56 |
| Tensile, MD | | | | |
| 100% Modulus, psi | 265 | 270 | 260 | 315 |
| 300% Modulus, psi | 390 | 415 | 425 | 530 |
| Tensile Strength, psi | 820 | 495 | 540 | 560 |
| Elongation, % | 680 | 405 | 425 | 435 |
| Tensile, TD | | | | |
| 100% Modulus, psi | 210 | 195 | 180 | 210 |
| 300% Modulus, psi | 320 | 330 | 320 | 360 |
| Tensile Strength, psi | 1780 | 1030 | 810 | 935 |
| Elongation, % | 880 | 735 | 670 | 740 |
| Compression Set | | | | |
| 70° C./22 hrs, % | 40 | 37 | 35 | 65 |
| 100° C./22 hrs, % | 66 | 60 | 58 | 75 |
| 120° C./22 hrs, % | 74 | 65 | 70 | 85 |
| OBO under any condition? | no | no | no | no |
| 120° C./4 wk aging, OBO? | no | no | no | no |

TABLE 13

| | Formulation Number | | | |
|---|---|---|---|---|
| | 8.5 | 8.6 | 8.7 | 8.8 |
| G1651H | 100 | | | 100 |
| Blend #4 | | 150 | | |
| Blend #5 | | | 150 | |
| S-EB #1 | | | | 66 |
| PP 5A15H | 40 | 40 | 40 | 40 |
| Drakeol 34 | 150 | 100 | 100 | 100 |
| CaCO3 | 65 | 65 | 65 | 65 |
| Additives | 1.6 | 1.6 | 1.6 | 1.6 |
| MFR @ 230° C./5 kg, g/10' | 53 | 80 | 45 | N/A |
| Hardness, 10 s | 51 | 47 | 49 | 52 |
| Tensile, MD | | | | |
| 100% Modulus, psi | 185 | 180 | 180 | 210 |
| 300% Modulus, psi | 280 | 275 | 285 | 400 |
| Tensile Strength, psi | 1235 | 570 | 545 | 505 |
| Elongation, % | 865 | 685 | 640 | 425 |
| Tensile, TD | | | | |
| 100% Modulus, psi | 150 | 140 | 135 | 160 |
| 300% Modulus, psi | 235 | 225 | 230 | 275 |
| Tensile Strength, psi | 1370 | 945 | 765 | 620 |
| Elongation, % | 935 | 915 | 835 | 710 |
| Compression Set | | | | |
| 70° C./22 hrs, % | 40 | 36 | 38 | 65 |
| 100° C./22 hrs, % | 71 | 62 | 68 | 74 |
| 120° C./22 hrs, % | 76 | 67 | 72 | 79 |
| OBO under any condition? | no | no | no | no |
| 120° C./4 wk aging, OBO? | no | no | no | no |

EXAMPLE #9

Part appearance is extremely important for transparent applications in the medical and compounding industry. Gel formation is a significant hindrance to good part appearance both in transparent and colored parts. The formation of gel particles is often caused by inhomogeneous oil incorporation when processing oil is dry blended with traditional block copolymers. This example illustrates that TSM's used in conjunction with traditional oil result in significantly reduced gel formation in a final injection molded or extruded part. Formulations 9.1 and 9.2 were compounded in a twin screw extruder using techniques known to one skilled in the art. The formulations were then subsequently extruded into thin strips. Strips are visually ranked in a qualitative fashion in terms of gel frequency and gel size with being the worst and 0 being the best. The qualitative ranking is expressed in terms of frequency×size. It can be seen that gel particles are virtually eliminated in formulation 9.2 containing 50 phr of TSM-1B whereas formulation 9.1 has a significant amount of observable gel particles. It should be noted that the same lot of G-1651 was used in the creation of Blend #3 and formulation 9.1 for comparative purposes.

|  | Formulation | |
| --- | --- | --- |
|  | 9.1 | 9.2 |
| G-1651 | 100 |  |
| Blend #3 |  | 150 |
| PP 5E63 | 37 | 37 |
| Drakeol 34 | 190 | 140 |
| Irganox 1010 | 0.3 | 0.3 |
| Total | 327.3 | 327.3 |
| Gels (frequency × size) | >4 × 4 | <1 × <1 (no gels) |
| Hardness, Shore A | 32 | 40 |

What is claimed is:

1. A block copolymer composition comprising:
 (a) 100 parts by weight of a solid selectively hydrogenated block copolymer having the general configuration A-B, A-B-A, A-B-A-B, (A-B)$_n$, (A-B-A)$_n$, (A-B-A)$_n$X, (A-B)$_n$X or mixtures thereof, where n is an integer from 2 to about 30, and X is coupling agent residue and wherein:
  i. prior to hydrogenation each A block is a mono alkenyl arene polymer block and each B block is a conjugated diene block having a vinyl content ($V_1$) between 25 weight percent and 85 weight percent;
  ii. subsequent to hydrogenation about 0-10% of the arene double bonds have been reduced, and at least about 90% of the conjugated diene double bonds have been reduced;
  iii. each A block having a number average molecular weight between about 3,000 and about 60,000 and each B block having a number average molecular weight ($MW_1$) between about 30,000 and about 300,000; and
  iv. the total amount of mono alkenyl arene in the hydrogenated block copolymer is about 20 percent weight to about 80 percent weight; and
 (b) 5 to 250 parts by weight of a hydrogenated tailored softening modifier which is structurally related to the character of the B block of said selectively hydrogenated block copolymer wherein:
  i. said softening modifier contains at least one hydrogenated conjugated diene wherein prior to hydrogenation said modifier has a vinyl content $V_2$, such that the ratio of $V_2/V_1$ is between 0.8 and 1.2;
  ii. subsequent to hydrogenation at least about 90% of the conjugated diene double bonds have been reduced;
  iii. the ratio ($MW_2$)/($MW_1$) of the number average molecular weight of said softening modifier ($MW_2$) to the number average molecular weight of said B block ($MW_1$) is 0.01 to 0.3, with a minimum molecular weight ($MW_2$) of 2,000 and a maximum molecular weight ($MW_2$) of 20,000; and
  iv. when the polydispersity index (PDI) of said softening modifier is between 1.0 and less than 1.5, the number average molecular weight of said softening modifier is between 2,000 and 7,000, and when the PDI is between 1.5 and 4.0, the number average molecular weight is between 2,000 and 20,000, where the polydispersity index is the ratio of the weight average molecular weight divided by the number average molecular weight; and
 (c) wherein said tailored softening modifier is formed in solution in the presence of a solvent in a second reactor to form a second solution and combined with a first solution prepared in a first reactor having a solvent to form a common solution, wherein said hydrogenated block copolymer is polymerized in said first solution or said common solution, and
 (d) the solvent is removed from the common solution subsequent polymerization of the hydrogenated block copolymer, providing an intimate mixture of said selectively hydrogenated block copolymer and said tailored softening modifier.

2. The composition according to claim 1 wherein said mono alkenyl arene for the selectively hydrogenated block copolymer is selected from styrene, alpha-methyl styrene and mixtures thereof and wherein said conjugated diene for the selectively hydrogenated block copolymer and the softening modifier is selected from the group consisting of isoprene, 1,3-butadiene and mixtures thereof.

3. The composition according to claim 2 wherein said conjugated diene is 1,3-butadiene and wherein about 25 to about 80 mol percent of the condensed butadiene units in block B and in the softening modifier have 1,2-configuration prior to hydrogenation.

4. The composition according to claim 3 wherein said selectively hydrogenated block copolymer is selected from the group consisting of (i) block copolymers having an overall structure A-B-A, said block A having a molecular weight of between 5,000 and 45,000, said block B having a molecular weight of between 30,000 and 300,000, and (ii) block copolymers having an overall structure (A-B)$_n$X where n is between 2 and 6, said block A having a molecular weight of between 5,000 and 45,000, said block B having a molecular weight of between 30,000 and 150,000, and wherein said softening modifier has a number average molecular weight of between 2,000 and 7,000 and a polydispersity index of between 1.0 and less than 1.5.

5. The composition according to claim 3 wherein said selectively hydrogenated block copolymer is selected from the group consisting of (i) block copolymers having an overall structure A-B-A, said block A having a molecular weight of between 5,000 and 45,000, said block B having a molecular weight of between 30,000 and 300,000, and (ii) block copolymers having an overall structure (A-B)$_n$X where n is between 2 and 6, said block A having a molecular weight of between 5,000 and 45,000, said block B having a molecular weight of between 30,000 and 150,000, and wherein said softening modifier has a number average molecular weight of between 2,000 and 20,000 and a polydispersity index of between 1.5 and 4.0.

6. The composition according to claim 3 wherein said first solution and second solution are combined after polymerization of both the selectively hydrogenated block copolymer and the tailored softening modifier, and prior to hydrogenation, and said common solution is hydrogenated.

7. The composition according to claim 3 wherein said first solution and second solution are combined after hydrogenation of both the selectively hydrogenated block copolymer and the tailored softening modifier, and prior to finishing.

8. The composition according to claim 3 wherein said second solution is added to said first solution prior to polymerization of said selectively hydrogenated block copolymer.

9. The composition according to claim 3 wherein said second solution is added to said first solution during the polymerization of said selectively hydrogenated block copolymer.

10. A block copolymer composition comprising:
(a) 100 parts by weight of a solid selectively hydrogenated block copolymer having the general configuration A-B, A-B-A, A-B-A-B, $(A-B)_n$, $(A-B-A)_n$, $(A-B-A)_nX$, $(A-B)_nX$ or mixtures thereof, where n is an integer from 2 to about 30, and X is coupling agent residue and wherein:
  i. prior to hydrogenation each A block is a mono alkenyl arene polymer block and each B block is a polymer block of at least one conjugated diene having a vinyl content ($V_1$) between 25 weight percent and 85 weight percent;
  ii. subsequent to hydrogenation about 0-10% of the arene double bonds have been reduced, and at least about 90% of the conjugated diene double bonds have been reduced;
  iii. each A block having a peak molecular weight between about 3,000 and about 60,000 and each B block having a peak molecular weight ($MW_1$) between about 30,000 and about 300,000; and
  iv. the total amount of mono alkenyl arene in the hydrogenated block copolymer is about 20 percent weight to about 80 percent weight; and
(b) 5 to 250 parts by weight of a hydrogenated tailored softening modifier which is structurally related to the character of the B block of said selectively hydrogenated block copolymer wherein:
  i. said softening modifier contains at least one hydrogenated conjugated diene wherein prior to hydrogenation said modifier has a vinyl content $V_2$, such that the ratio of $V_2/V_1$ is between 0.8 and 1.2;
  ii. subsequent to hydrogenation at least about 90% of the conjugated diene double bonds have been reduced;
  iii. the ratio $(MW_2)/(MW_1)$ of the number average molecular weight of said softening modifier ($MW_2$) to the number average molecular weight of said B block ($MW_1$) is 0.01 to 0.3, with a minimum molecular weight ($MW_2$) of 2,000 and a maximum molecular weight ($MW_2$) of 20,000; and
  iv. when the polydispersity index (PDI) of said softening modifier is between 1.0 and less than 1.5, the number average molecular weight of said softening modifier is between 2,000 and 7,000, and when the PDI is between 1.5 and 4.0, the number average molecular weight is between 2,000 and 20,000, where the polydispersity index is the ratio of the weight average molecular weight divided by the number average molecular weight;
and
(c) wherein said selectively hydrogenated block copolymer is formed in solution in a reactor in the presence of a solvent and said tailored softening modifier is formed in the same solution in the same reactor; and
(d) the solvent is removed from the solution, providing an intimate mixture of said selectively hydrogenated block copolymer and said tailored softening modifier.

11. The composition according to claim 10 wherein said mono alkenyl arene for the selectively hydrogenated block copolymer is selected from styrene, alpha-methyl styrene and mixtures thereof and wherein said conjugated diene for the selectively hydrogenated block copolymer and the softening modifier is selected from the group consisting of isoprene, 1,3-butadiene and mixtures thereof.

12. The composition according to claim 11 wherein said conjugated diene is butadiene, and wherein about 25 to about 80 mol percent of the condensed butadiene units in block B and in the softening modifier have 1,2-configuration prior to hydrogenation.

13. The composition according to claim 12 wherein said selectively hydrogenated block copolymer is selected from the group consisting of (i) block copolymers having an overall structure A-B-A, said block A having a molecular weight of between 5,000 and 45,000, said block B having a molecular weight of between 30,000 and 300,000, and (ii) block copolymers having an overall structure $(A-B)_nX$ where n is between 2 and 6, said block A having a molecular weight of between 5,000 and 45,000, said block B having a molecular weight of between 30,000 and 150,000, and wherein said softening modifier has a number average molecular weight of between 2,000 and 7,000 and a polydispersity index of between 1.0 and less than 1.5.

14. The composition according to claim 12 wherein said selectively hydrogenated block copolymer is selected from the group consisting of (i) block copolymers having an overall structure A-B-A, said block A having a molecular weight of between 5,000 and 45,000, said block B having a molecular weight of between 30,000 and 300,000, and (ii) block copolymers having an overall structure $(A-B)_nX$ where n is between 2 and 6, said block A having a molecular weight of between 5,000 and 45,000, said block B having a molecular weight of between 30,000 and 150,000, and wherein said softening modifier has a number average molecular weight of between 2,000 and 20,000 and a polydispersity index of between 1.5 and 4.0.

15. The composition according to claim 12 wherein said softening agent is polymerized prior to the polymerization of said selectively hydrogenated block copolymer.

16. The composition according to claim 12 wherein said softening agent is polymerized during the polymerization of the B block of said selectively hydrogenated block copolymer.

17. The composition according to claim 12 wherein said softening agent is polymerized after the polymerization of said selectively hydrogenated block copolymer.

18. A formulated composition comprising the composition of claim 1 and at least one component selected from fillers, reinforcements, polymer extending oils, tackifying resins, lubricants, stabilizers, styrene polymers, antioxidants, styrene/diene block copolymers and polyolefins.

19. An article comprising the composition of claim 18, wherein said article is formed in a process selected from injection molding, over molding, dipping, extrusion, roto molding, slush molding, fiber spinning, film making or foaming.

20. An article comprising the composition of claim 18, wherein said article is selected from closures, synthetic corks, cap seals, tubing, food containers, beverage containers, interior automotive parts, window gaskets, oil gels, foamed products, bicomponent fibers, monofilaments, adhesives, cosmetics and medical goods.

21. A block copolymer composition comprising:
(a) 100 parts by weight of a solid selectively hydrogenated block copolymer having the general configuration A-B, A-B-A, A-B-A-B, $(A-B)_n$, $(A-B-A)_n$, $(A-B-A)_nX$, $(A-B)_nX$ or mixtures thereof, where n is an integer from 2 to about 30, and X is coupling agent residue and wherein:

i. prior to hydrogenation each A block is a mono alkenyl arene polymer block and each B block is a polymer block of at least one conjugated diene having a vinyl content ($V_1$) between 25 weight percent and 85 weight percent;
ii. subsequent to hydrogenation about 0-10% of the arene double bonds have been reduced, and at least about 90% of the conjugated diene double bonds have been reduced;
iii. each A block having a peak molecular weight between about 3,000 and about 60,000 and each B block having a peak molecular weight ($MW_1$) between about 30,000 and about 300,000; and
iv. the total amount of mono alkenyl arene in the hydrogenated block copolymer is about 20 percent weight to about 80 percent weight; and (b) 5 to 250 parts by weight of a hydrogenated tailored softening modifier which is structurally related to the character of the B block of said selectively hydrogenated block copolymer wherein:
i. said softening modifier contains at least one hydrogenated conjugated diene wherein prior to hydrogenation said modifier has a vinyl content $V_2$, such that the ratio of $V_2/V_1$ is between 0.8 and 1.2;
ii. subsequent to hydrogenation at least about 90% of the conjugated diene double bonds have been reduced;
iii. the ratio ($MW_2$)/($MW_1$) of the number average molecular weight of said softening modifier ($MW_2$) to the number average molecular weight of said B block ($MW_1$) is 0.01 to 0.3, with a minimum molecular weight ($MW_2$) of 2,000 and a maximum molecular weight ($MW_2$) of 20,000; and
iv. when the polydispersity index (PDI) of said softening modifier is between 1.0 and less than 1.5, the number average molecular weight of said softening modifier is between 2,000 and 7,000, and when the PDI is between 1.5 and 4.0, the number average molecular weight is between 2,000 and 20,000, where the polydispersity index is the ratio of the weight average molecular weight divided by the number average molecular weight;

(c) wherein said selectively hydrogenated block copolymer is dissolved in the presence of a solvent in a first reactor to form a first solution and said softening modifier is polymerized in solution in the presence of a solvent in a second reactor to form a second solution;
(d) said first and second solutions are combined to form a common solution; and
(e) the solvent is removed from the common solution, providing an intimate mixture of said selectively hydrogenated block copolymer and said tailored softening modifier.

22. The composition according to claim 1 wherein said A block consists of a mixture of styrene and alpha-methyl styrene, wherein the amount of alpha-methyl styrene is from 25 to 50 mol percent based on the total amount of styrene and alpha-methyl styrene in said A block, and said conjugated diene is selected from the group consisting of isoprene, 1,3-butadiene and mixtures thereof.

23. The composition according to claim 10 wherein said A block consists of a mixture of styrene and alpha-methyl styrene, wherein the amount of alpha-methyl styrene is from 25 to 50 mol percent based on the total amount of styrene and alpha-methyl styrene in said A block, and said conjugated diene is selected from the group consisting of isoprene, 1,3-butadiene and mixtures thereof.

24. A block copolymer composition comprising:
(a) 100 parts by weight of a solid selectively hydrogenated block copolymer having the general configuration A-B, A-B-A, A-B-A-B, (A-B)$_n$, (A-B-A)$_n$, (A-B-A)$_n$X, (A-B)$_n$X or mixtures thereof, where n is an integer from 2 to about 30, and X is coupling agent residue and wherein:
i. prior to hydrogenation each A block is a mono alkenyl arene polymer block and each B block is a conjugated diene block having a vinyl content ($V_1$) between 25 weight percent and 85 weight percent;
ii. subsequent to hydrogenation about 0-10% of the arene double bonds have been reduced, and at least about 90% of the conjugated diene double bonds have been reduced;
iii. each A block having a number average molecular weight between about 3,000 and about 60,000 and each B block having a number average molecular weight ($MW_1$) between about 30,000 and about 300,000; and
iv. the total amount of mono alkenyl arene in the hydrogenated block copolymer is about 20 percent weight to about 80 percent weight; and (b) 5 to 250 parts by weight of an unhydrogenated tailored softening modifier which is structurally related to the character of the B block of said selectively hydrogenated block copolymer wherein:
i. said softening modifier contains at least one unhydrogenated conjugated diene which has a vinyl content $V_2$, such that the ratio of $V_2/V_1$ is between 0.8 and 1.2;
ii. the ratio ($MW_2$)/($MW_1$) of the number average molecular weight of said softening modifier ($MW_2$) to the number average molecular weight of said B block ($MW_1$) is 0.01 to 0.3, with a minimum molecular weight ($MW_2$) of 2,000 and a maximum molecular weight ($MW_2$) of 20,000; and
iii. when the polydispersity index (PDI) of said softening modifier is between 1.0 and less than 1.5, the number average molecular weight of said softening modifier is between 2,000 and 7,000, and when the PDI is between 1.5 and 4.0, the number average molecular weight is between 2,000 and 20,000, where the polydispersity index is the ratio of the weight average molecular weight divided by the number average molecular weight;
and (c) wherein said selectively hydrogenated block copolymer is formed in a first solution in the presence of a solvent in a first reactor and said tailored softening modifier is formed in solution in the presence of a solvent in a second reactor to form a second solution;
(d) said first and second solutions are combined to form a common solution; and
(e) the solvent is removed from the common solution, providing an intimate mixture of said selectively hydrogenated block copolymer and said tailored softening modifier.

25. The composition of claim 1 further comprising polypropylene.

26. The composition of claim 10 further comprising polypropylene.

27. The composition of claim 21 further comprising polypropylene.

* * * * *